(12) United States Patent
Vogel et al.

(10) Patent No.: US 9,091,185 B2
(45) Date of Patent: Jul. 28, 2015

(54) VALVE CONTROL FOR AT LEAST ONE OF AN INTERNAL COMBUSTION ENGINE

(75) Inventors: Werner Vogel, Burgoberbach (DE); Heribert Möller, Sachsen (DE)

(73) Assignee: MAN Truck & Bus AG, Munich (DE)

( * ) Notice: Subject to any disclaimer, the term of this patent is extended or adjusted under 35 U.S.C. 154(b) by 41 days.

(21) Appl. No.: 13/535,853

(22) Filed: Jun. 28, 2012

(65) Prior Publication Data
US 2013/0167788 A1 Jul. 4, 2013

(30) Foreign Application Priority Data

Jul. 2, 2011 (DE) .......................... 10 2011 106 395

(51) Int. Cl.
| | |
|---|---|
| F01L 1/18 | (2006.01) |
| F01L 1/08 | (2006.01) |
| F01L 1/26 | (2006.01) |
| B23P 15/00 | (2006.01) |

(52) U.S. Cl.
CPC .................. *F01L 1/181* (2013.01); *B23P 15/00* (2013.01); *F01L 1/08* (2013.01); *F01L 1/182* (2013.01); *F01L 1/26* (2013.01); *F01L 2105/00* (2013.01); *F01L 2105/02* (2013.01); *Y10T 29/49231* (2015.01)

(58) Field of Classification Search
CPC ............. F01L 1/08; F01L 1/181; F01L 1/182; F01L 1/26; F01L 2105/00; F01L 2105/02; B23P 15/00; Y10T 29/49231
USPC ........... 123/90.39, 90.44, 90.48, 90.6; 74/569
See application file for complete search history.

(56) References Cited

U.S. PATENT DOCUMENTS

| | | | | |
|---|---|---|---|---|
| 1,254,227 | A * | 1/1918 | Huber ............................. | 384/13 |
| 2,829,540 | A * | 4/1958 | Niemeyer ....................... | 74/569 |
| 4,085,634 | A * | 4/1978 | Sattler ............................. | 82/19 |
| 4,436,062 | A * | 3/1984 | Nakakobara et al. ....... | 123/90.27 |
| 4,652,724 | A * | 3/1987 | Morita et al. ............ | 219/121.85 |
| 4,693,214 | A   | 9/1987 | Titolo | |
| 4,773,361 | A * | 9/1988 | Toki et al. .................. | 123/90.23 |
| 4,869,215 | A * | 9/1989 | Parsons ...................... | 123/90.16 |
| 5,101,778 | A * | 4/1992 | Fukuo et al. ................ | 123/90.27 |
| 5,111,781 | A * | 5/1992 | Kaku et al. .................. | 123/90.16 |
| 5,931,125 | A * | 8/1999 | Valasopoulos ............. | 123/90.16 |
| 5,937,811 | A * | 8/1999 | Motosugi et al. .......... | 123/90.18 |
| 6,386,159 | B1* | 5/2002 | Roberts ....................... | 123/90.16 |
| 6,745,736 | B2* | 6/2004 | Walters ....................... | 123/90.18 |
| 6,834,629 | B2* | 12/2004 | Saiki et al. ................... | 123/90.6 |
| 2007/0221155 | A1* | 9/2007 | Waseda et al. ............. | 123/90.44 |

FOREIGN PATENT DOCUMENTS

| | | |
|---|---|---|
| DE | 4230809 A1 | 3/1994 |
| DE | 19612551 A1 | 10/1997 |

* cited by examiner

*Primary Examiner* — Zelalem Eshete
(74) *Attorney, Agent, or Firm* — Cozen O'Connor

(57) ABSTRACT

Valve control for at least one valve of an internal combustion engine, in which the movement of at least one cam (2) of a camshaft (3) can be transmitted to a valve stem (5) of the valve (1) by a transmission mechanism (4), the transmission mechanism (4) including at least one transmission element (7) which is mounted rotatably on an axis (6) and is preferably designed as a rocker arm (10) or drag lever and which is connected to the camshaft (3) via a contact element (8) arranged on the transmission element (7), the contact surface (19) of the contact element (8) and the circumferential surface (20) of the cam (2) having, at least in regions, curved and mutually corresponding contours in the axial direction (21), and the transmission element (7) being mounted axially moveably on an axial body (11) of the axis (6).

19 Claims, 8 Drawing Sheets

VALVE CONTROL FOR AT LEAST ONE OF AN INTERNAL COMBUSTION ENGINE

BACKGROUND OF THE INVENTION

1. Field of the Invention

The present invention relates to a valve control for at least one valve of an internal combustion engine, in which the movement of at least one cam of a camshaft can be transmitted to a valve stem of the valve by a transmission mechanism, the transmission mechanism comprising at least one transmission element which is mounted rotatably on an axis and which is connected to the camshaft via a contact element arranged on the transmission element.

2. Background of the Invention

The laid-open publication DE 196 12 551 A1 discloses a valve drive which consists of two common cam follower parts arranged pivotably movably on a separate tubular portion, the cam follower parts forming a rocker arm which is mounted rotatably at a centre of rotation. The cam follower part possesses a roller against which a cam runs. At the same time, the further cam follower part has at its other end a hydraulic play compensation element which is not described in any more detail at this juncture.

Furthermore, the publication U.S. Pat. No. 4,693,214 discloses a tappet device for internal combustion engines with a camshaft, the cams of which have a variable profile and which actuates at least one valve. In this case, different activation of the valve is implemented by means of the longitudinal adjustment of the camshaft.

The laid-open publication DE 42 30 809 A1 teaches a valve control for at least two simultaneously actuable valves forming a group, a control cam of the valve control having on its circumference a ball track into which a ball engages.

The rocker arms known from the prior art are provided with fixing in position in the axial direction on their rocker arm axes, so that fixing in position in the axial direction takes place via corresponding bearing surfaces on the flanks of the rocker arms and of the rocker arm bearing block. These flanks are often produced by calibrating the forging blank or by mechanical machining.

On the rocker arm bearing block side, fixing takes place via appropriately machined surfaces and additional components, such as washers and securing rings.

One object on which the invention is based is to develop a valve control for at least one valve of an internal combustion engine, in such a way that the said valve control occupies a smaller construction space and requires a smaller number of components in the valve drive, and/or in such a way that the problem presented by the "edge bearer" in the contact region of the cam and contact element is neutralized. Furthermore, it is an object of the present invention to reduce the Hertzian stress by reducing the required crowning. Moreover, a further object of the present invention is to reduce the production costs of a valve drive.

SUMMARY OF THE INVENTION

According to the present invention the contact surface of the contact element and the circumferential surface of the cam have, at least in regions, curved, mutually corresponding contours in the axial direction of the axis on which the rocker arm is mounted, and the transmission element is mounted axially moveably on an axial body of the axis. By means of the corresponding contours of the contact element and cam, a relative movement of the two contact partners with respect to one another in the axial direction can be prevented or attenuated. On account of this limited moveability of the contact element and cam in the axial direction, axial "self-guidance" of the contact element and therefore of the transmission element on its axis, starting from the cam, is achieved.

For this purpose, considered diagrammatically, contact in the form of a curved line is implemented by the curvature of the circumferential surface of the cam in the axial direction and by the corresponding adaptation of the contact element.

What is meant by the corresponding contours of the cam and contact element is that these have respective shapes at least approximately completing one another. That is to say, the cam is designed to be concave in the axial direction and the contact element to be convex in the axial direction, or vice versa. Preferably, the corresponding contours are configured such that they at least approximately "fit together", that is to say, when assembled, form a contact surface which touches as centrally as possible and, considered diagrammatically, forms a curved touch line. Preferably, this touch line is at least a quarter as long as the maximum width of the shorter of the two contact partners (cam and contact element).

Preferably, the contact element is designed as a rolling body which is mounted rotatably in a defined manner on the transmission element via a rolling body axis, the circumferential surface of the rolling body serving as a contact surface with the cam. A barrel-shaped rolling body is advantageous. Preferably, the axis of rotation of at least part of the transmission element runs parallel to the axis of rotation of the rolling body. In this case, both the rolling body and, alternatively, the cam may be provided with a concave recess for receiving the correspondingly convexly designed counterpiece. Alternatively to a rolling body, the contact element may also be designed as a spherical body which is mounted movably on the transmission element via a spherical receptacle, the surface of the spherical body serving as a contact surface with the cam. In the case of a spherical body, this is mounted rotatably on the transmission element, but does not have a defined axis of rotation. Furthermore, if the contact element is configured as a spherical body, the camshaft must be provided with a groove which surrounds the circumference of the latter and which is intended for receiving the ball. Finally, in a further alternative, the contact element can be arranged as a positionally and rotationally fixed sliding piece on the transmission element.

An axial body is understood to mean both a rod-shaped body penetrating the transmission element and elements which connect the transmission element rotatably, for example, to a bearing block.

In a further advantageous embodiment, the curvature of the cam and/or of the contact element is not constant over the entire contour length, but instead the contour is provided in the axial direction of the cam and/or of the contact element with a middle region and with at least one edge-side marginal region, the middle region preferably being designed to be solely convex or solely concave. In this case, it may be advantageous if the marginal region itself and/or an intermediate region between the marginal region and the middle region are/is designed in such a way that the said intermediate region has a geometry or dimensioning of the contour which is different at least from the middle region. As a result of this targeted variation along the contour, for example, a centring function can be implemented, the result of which is that the contact partners are guided by corresponding curvatures of the contour.

In an actual embodiment of the valve control, it proved advantageous if the concave contour has in the axial direction of the contact surface of the contact element or of the circumferential contour of the cam a radius of 8 to 50 mm, preferably of 10 to 40 mm, especially preferably of 15 to 25 mm.

A further especially advantageous ratio is the ratio of the radius of the concave contour in the axial direction of the roller to the outside diameter of the roller, which amounts to between 1.00:0.15 and 1.00:3.45, preferably to between 1.0: 0.5 and 1.0:1.5, and/or the ratio of the radius of the concave contour of the roller to the width of the roller amounts to between 1.00:0.30 and 1.0:6.0, preferably to between 1.0:0.5 and 1:3, especially preferably to between 1:1 and 1.0:1.5.

The transmission element may preferably be designed as a rocker arm or drag lever, in which case the axis of rotation of the rocker arm or drag lever may be located both in the middle region and in the end region of the arm or lever.

In an especially preferred embodiment of the subject of the present invention, the transmission element is mounted axially moveably on its bearing axis. Particularly as a result of the configuration according to the invention of the contact-element/cam contact and of the resulting axial guidance of the transmission element, the transmission element can consequently be mounted axially moveably on its axis, since inhibition, sufficient at least for specific operating phases, of the axial moveability of the transmission element on its axis can be ensured by the configuration according to the present invention. Preferably, the axial moveability of the transmission element is limited by at least one securing element. For example, this securing element can be configured in such a way that, in the event of a malfunction or partial defect of the valve control, limited axial moveability of the transmission element on its axis can be ensured.

Preferably, the axis of the transmission element is fastened on a bearing block, and the bearing block is provided with at least one reception recess having flank regions.

The transmission element is arranged so as to project, at least in regions, in the inner spaces of the reception recess, the flank regions at least partially surrounding the transmission element on both sides, and consequently the above-described function of a securing element being implementable.

For example, the surrounding of the transmission element on both sides by the flank regions is provided with a clearance between the flank regions and the transmission element which preferably comprises a clearance of 0.5 to 40.0 mm, especially preferably of 1 to 5 mm.

Furthermore, it proved beneficial if an axial element for mounting at least two transmission elements is fastened on the bearing block and the bearing block has at least two reception recesses, in the inner space of which a transmission element can be received in each case, a connection means for fixing the axis being arranged preferably in the region of a middle web of the bearing block which is arranged between the at least two reception recesses. By the transmission element being arranged, for example, in pairs in this way on a plurality of axes installed inside an engine, advantageous freedom of configuration in the arrangement of the transmission element and of the individual axes can be ensured, and therefore the volume of the overall valve control can be reduced.

In an advantageous development of the invention, at least two transmission elements and preferably four transmission elements, especially preferably only two transmission elements, which are assigned to valves of different cylinders of an engine, are mounted on one axis. Thus, for example, there may be provision whereby a first transmission element of an axis controls at least one outlet valve of a first cylinder and a second transmission element of the same axis controls at least one outlet valve of a second cylinder. By transmission elements being assigned in this way to series-arranged cylinders, of an internal combustion engine comprising, for example, four, six or eight cylinders, a compact form of construction of the internal combustion engine is achieved.

In addition to the present valve control, the invention is also directed to a method for limiting the axial moveability of a transmission element for transmitting the movement of a cam of a camshaft to at least one valve, the transmission element being mounted on an axis and being provided with a contact element. In this case, it is essential that the transmission element is mounted axially moveably on the axis, the contact surface of the contact element and the circumferential surface of the cam having, at least in regions, contours curved in the axial direction and mutually corresponding, so that the curved corresponding touch surfaces of the contact element and cam ensure at least limitation of the axial moveability of the transmission element in relation to the axis. This is achieved in that the cam is fixed in position in the axial direction and, on account of the limited moveability in the axial direction of the cam and contact element or of the cam and transmission element, the contact element or the transmission element is consequently limited or guided in its movement in the axial direction indirectly via the cam. This method is preferably applied to transmission elements which are designed as rocker arms or drag levers and/or comprise as contact means a roller and/or ball mounted on the rocker arm or drag lever.

Finally, the present invention is directed to an engine with a valve control as described and/or an engine to which the method for limiting the moveability of the transmission element is applied. An engine designed in this way may in this case adopt a maximum of two rocker arms or drag levers having different geometry and/or dimensioning. Ideally, one standard rocker arm or drag lever may also be used on all the valve activation devices of the valve control. Particularly since the rocker arms or drag levers have no direct limitation of their axial position against their side faces, the rocker arms or drag levers can consequently be designed more uniformly, and therefore the number of required variants of the rocker arms or drag levers of the engine and, at the same time, the production costs can be reduced. Particularly in the case of different clearances between the inlet valves and the cylinder centre and/or between the outlet valves and the cylinder centre, at the same time with at least two transmission elements for an inlet valve and an outlet valve being mounted on one common axis, the axially moveable mounting can reduce the required variants of transmission elements.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in more detail by means of exemplary embodiments in the drawing figures in which.

DETAILED DESCRIPTION OF THE PRESENTLY PREFERRED EMBODIMENTS

Figure 1:
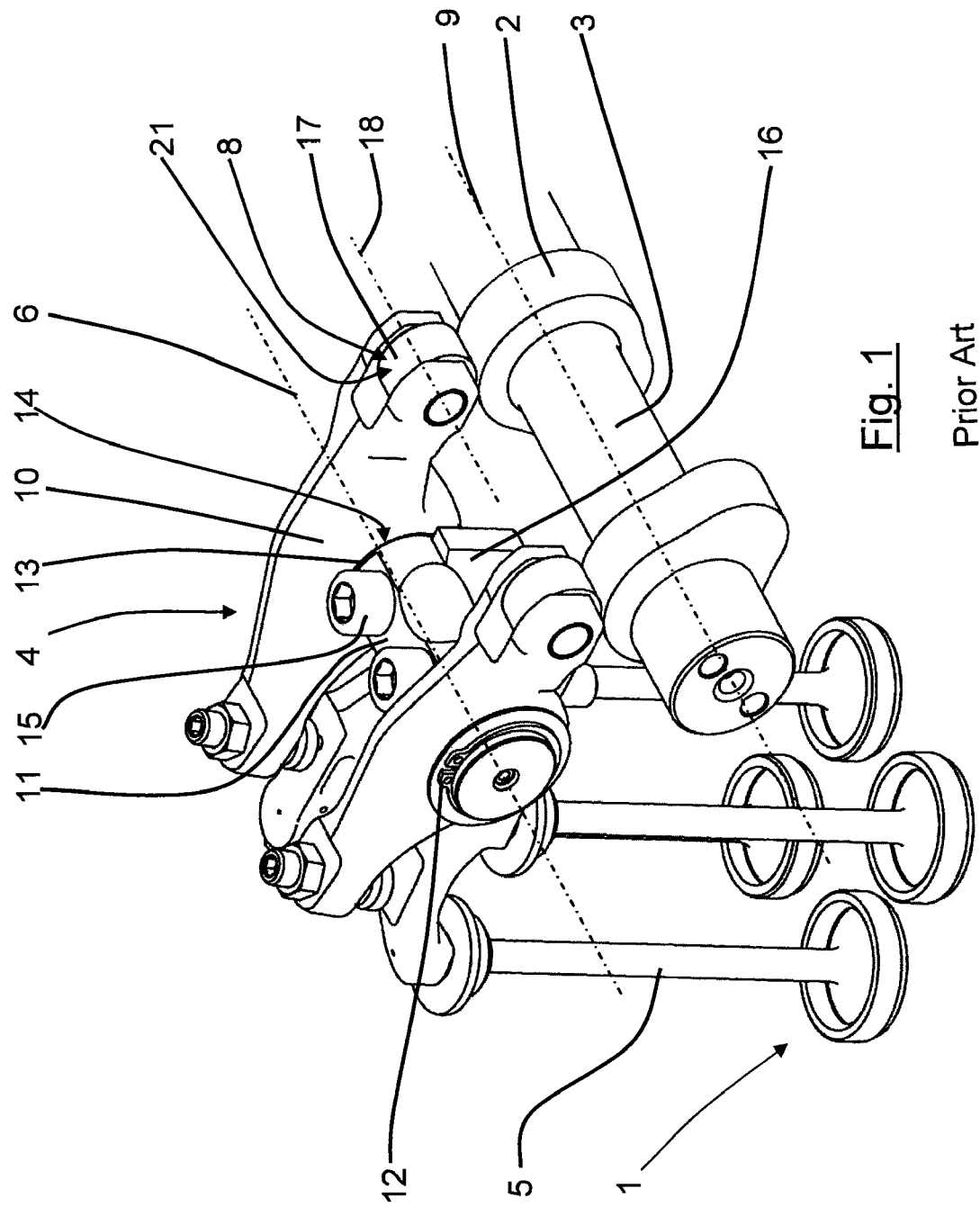
FIG. 1 shows a perspective illustration of two prior art rocker arms on one axis, the axial displaceability of the rocker arms being prohibited by securing rings.

Drawing FIG. 1 depicts a valve control 1 which is known from the prior art and which is provided for at least one valve 1 of an internal combustion engine (not illustrated), the movement of at least one cam 2 of a camshaft 3 being transmitted to a valve stem 5 of the valve 1 by a transmission mechanism 4. The transmission mechanism 4 in this case comprises at least one transmission element 7 which is mounted rotatably on an axis 6 and which is provided in turn with a contact element 8, via which the transmission element 7 is in contact with the camshaft 3. As a result of the rotational movement of the camshaft 3 about its camshaft axis 9, the transmission element 7 is forced, by the contact of the cam 2 with the contact element 8, into a rotational movement about the axis 6, so that a linear opening and closing movement of the valve 1 along the longitudinal axis of the valve stem 5 is executed.

In the version according to drawing FIG. 1, the transmission element 7 designed as rocker arms 10, 10' are fixed in position along the axis 6 on the axial body 11 by a securing ring 12 and on the opposite side by the contact of a bearing surface 13 with a step 14 of the axial body 11 along the axis 6. Furthermore, the axial body 11 is fastened on an axial block 16 via fixing means 15.

Figure 2:
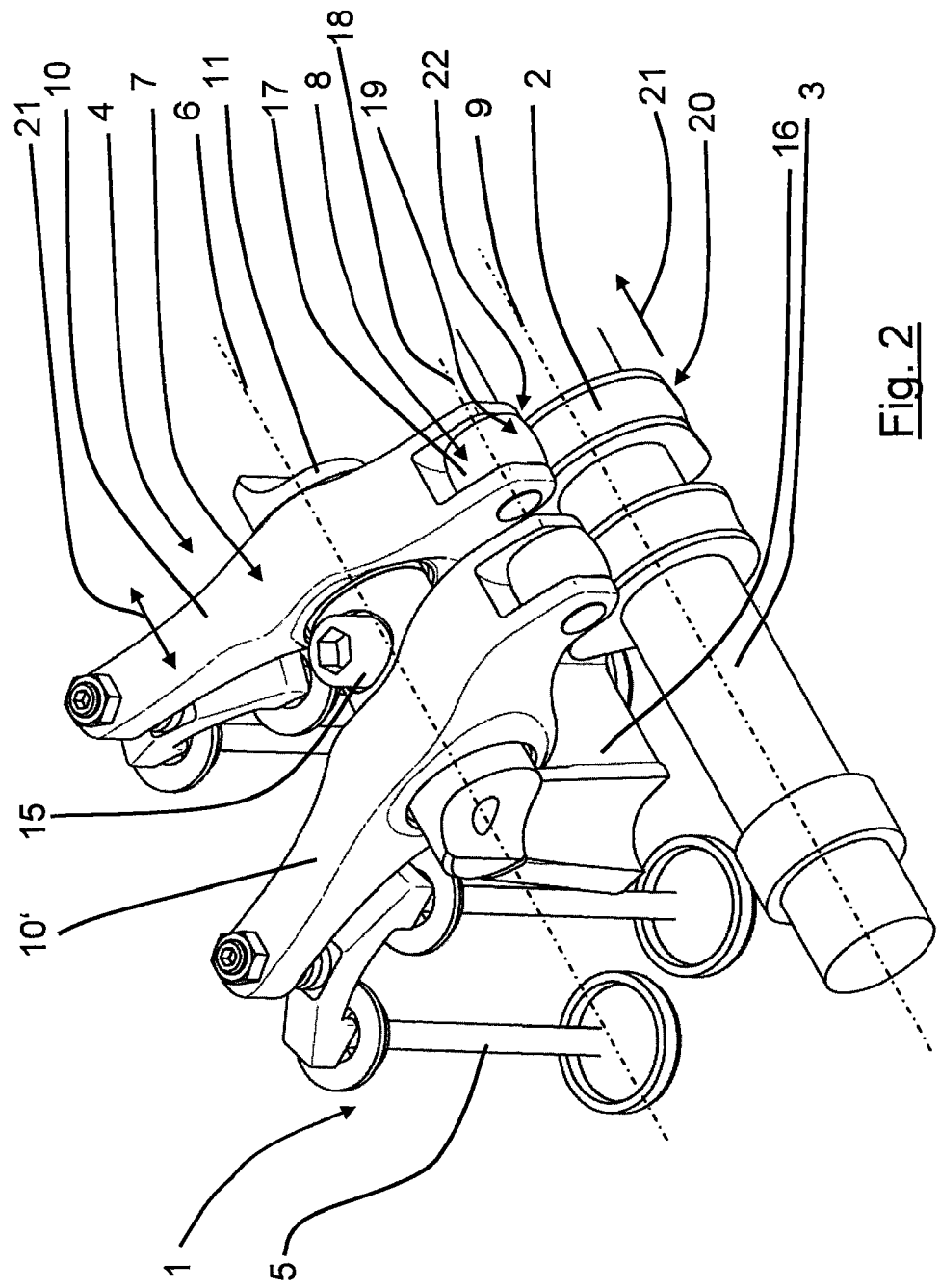
FIG. 2 shows a diagrammatic perspective illustration of a valve control according to the present invention, the cams of the camshaft being provided with a concave contour in the axial direction and the contact elements of the rocker arms with a convex contour in the axial direction.

As illustrated in drawing FIG. 2, the contact surface 19 of the contact element 8 and the circumferential surface 20 of the cam 2 are provided, at least in regions, with curved and mutually corresponding contours in the axial direction 21. The axial direction 21 illustrated by the arrow 21 in drawing FIG. 2 means the axis 6 about which the transmission element 7 is mounted rotatably, but alternatively or additionally, in the case of a contact element 8 designed as a rolling body 17, the axial direction 21 may refer to the rolling body axis 18. This is intended to reflect the fact that the curvature of the contact surface 19 and that of the circumferential surface 20 make a form fit in the axial direction 21 and consequently influence the transmission elements 7, 7' and/or the contact element in respect of the forces acting in the direction of the axis 6 and/or of the rolling body axis 18.

Figure 3A:
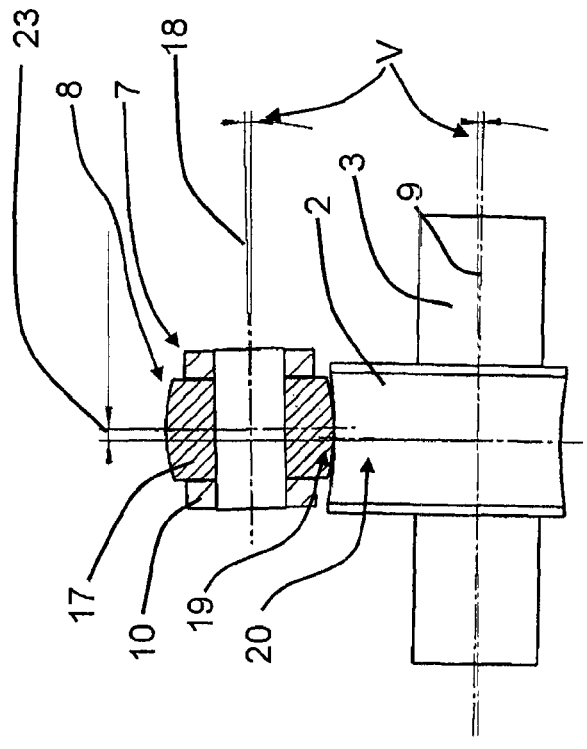
FIG. 3A shows a diagrammatic sectional illustration of the contact region of the roller and cam according to FIG. 2.
Figure 3B:
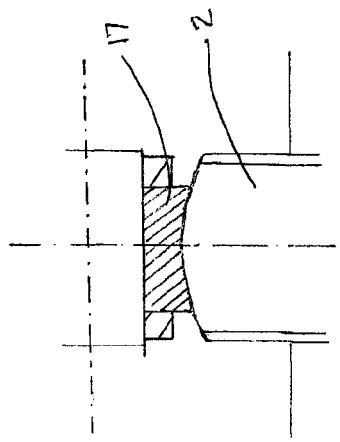
FIG. 3B shows a diagrammatic sectional illustration of FIG. 3A with concave rolling body and convex cam.

The contact element 8 is designed as a barrel-shaped roller body 17 which is mounted rotatably on the transmission element 7 via a rolling body axis 18, the contact surface 19 being designed as the circumferential surface 22 of the rolling body 17. Particularly drawing FIG. 3 illustrates the contact region between the contact element 8 and cam 2. In this case, the circumferential surface 22 of the rolling body 17 is designed with a convex contour region in the axial direction 21 and the circumferential surface 20 of the cam 2 with a concave contour region in the axial direction 21. It is also basically possible to provide the contact surface 19 with a concave contour region in the axial direction 21 and the circumferential surface with a convex contour region in the axial direction 21.

Figure 4:
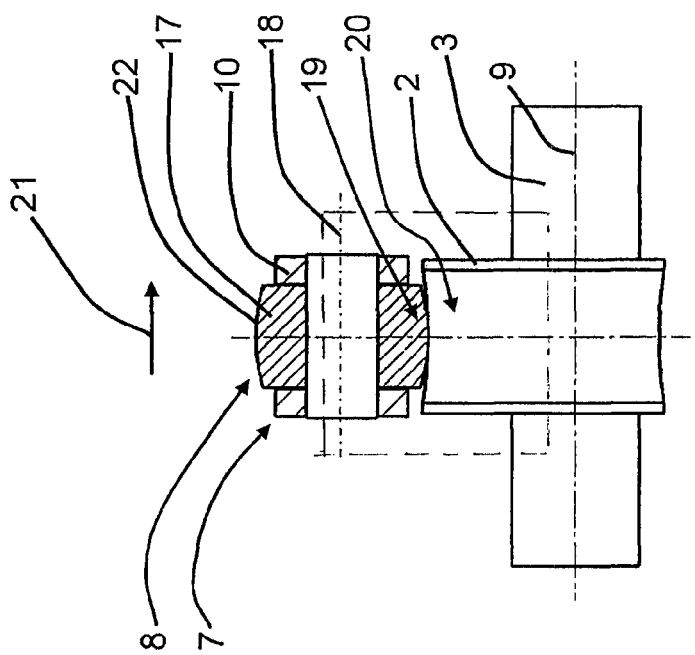
FIG. 4 shows a diagrammatic sectional illustration of the contact region according to FIG. 3 to explain the edge bearer effect.

Owing to distortion V of the camshaft 3 and/or of the rocker arm 10, taking place during the operation of the internal combustion engine, the problem known as "edge bearer" may arise in the prior art. In order to prevent the rolling body 17 from running on edge on the cam 2 or to reduce the adverse consequences of this, it is advantageous, according to the invention, to provide the contact surface 19 of the contact element 8 and the circumferential surface 20 of the cam 2 with contours, curved at least in regions and mutually corresponding, in the axial direction 21 and consequently in direction of the camshaft axis 9 and/or rolling body axis 18, cf. FIG. 4. As a result, even in the event of distortion V of the camshaft 3 and transmission element 7 and an accompanying offset 23 of the bearing centre points/contact centre points of the cam 2 and rolling body 17, sole contact at the edges of the rolling body 17 can be avoided.

Figure 5:
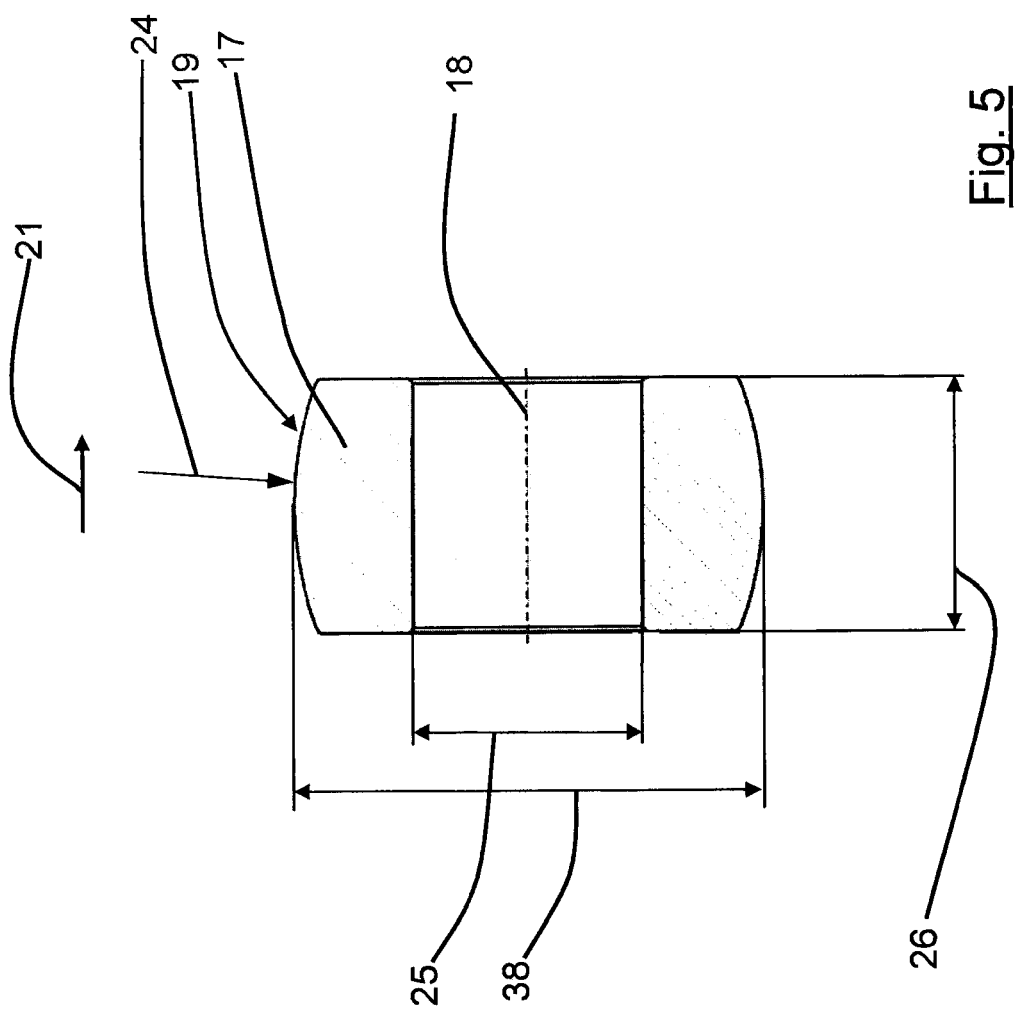
FIG. 5 shows a diagrammatic full-sectional illustration of a contour, curved according to the present invention, of a roller.

A preferred version of the actual embodiment of the rolling body 17 is presented in drawing FIG. 5. Here, the convex contour in the axial direction 21 of the contact surface 19 of the contact element 8 designed as a rolling body 17 is provided with a radius 24 of 8 to 50 mm, preferably of 10 to 40 mm, especially preferably of 15 to 25 mm. Alternatively, the convex contour in the axial direction 21 also on the circumferential surface 20 of the cam 2 may be designed to come within the above-described intervals. Furthermore, it can be seen from FIG. 5 that the rolling body 17 is provided along its rolling body axis 18 with a central bore which has an inside diameter 25 and about which the rolling body 17 is mounted rotatably.

For a contact element 8 designed as a rolling body 17, it proved advantageous, according to drawing FIG. 5, if the ratio of the radius 24 of the convex contour in the axial direction 21 of the rolling body 17 to the outside diameter 38 of the rolling body 17 amounts to between 1.00:0.15 and 1.00:3.45, preferably to between 1.0:0.5 and 1.0:1.5, and/or the ratio of the radius 24 of the convex contour in the axial direction of the rolling body 17 to the width 26 of the rolling body 17 amounts to between 1.00:0.30 and 1:6, preferably to between 1.0:0.5 and 1:3.0, especially preferably to between 1:1 and 1:1.5.

Figure 6:
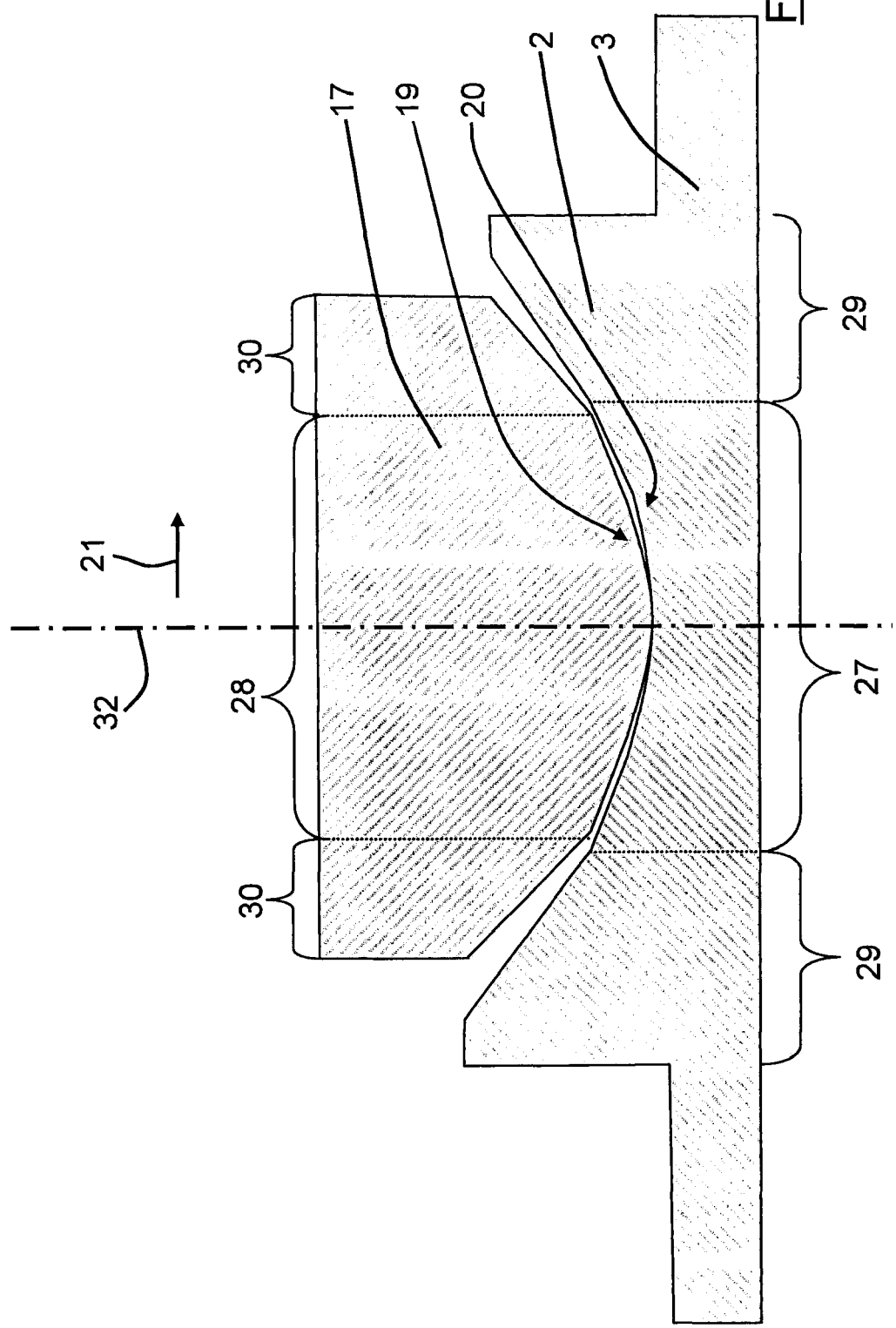
FIG. 6 shows a diagrammatic full-sectional illustration of the contact region of the rolling body and cam.
Figure 7:
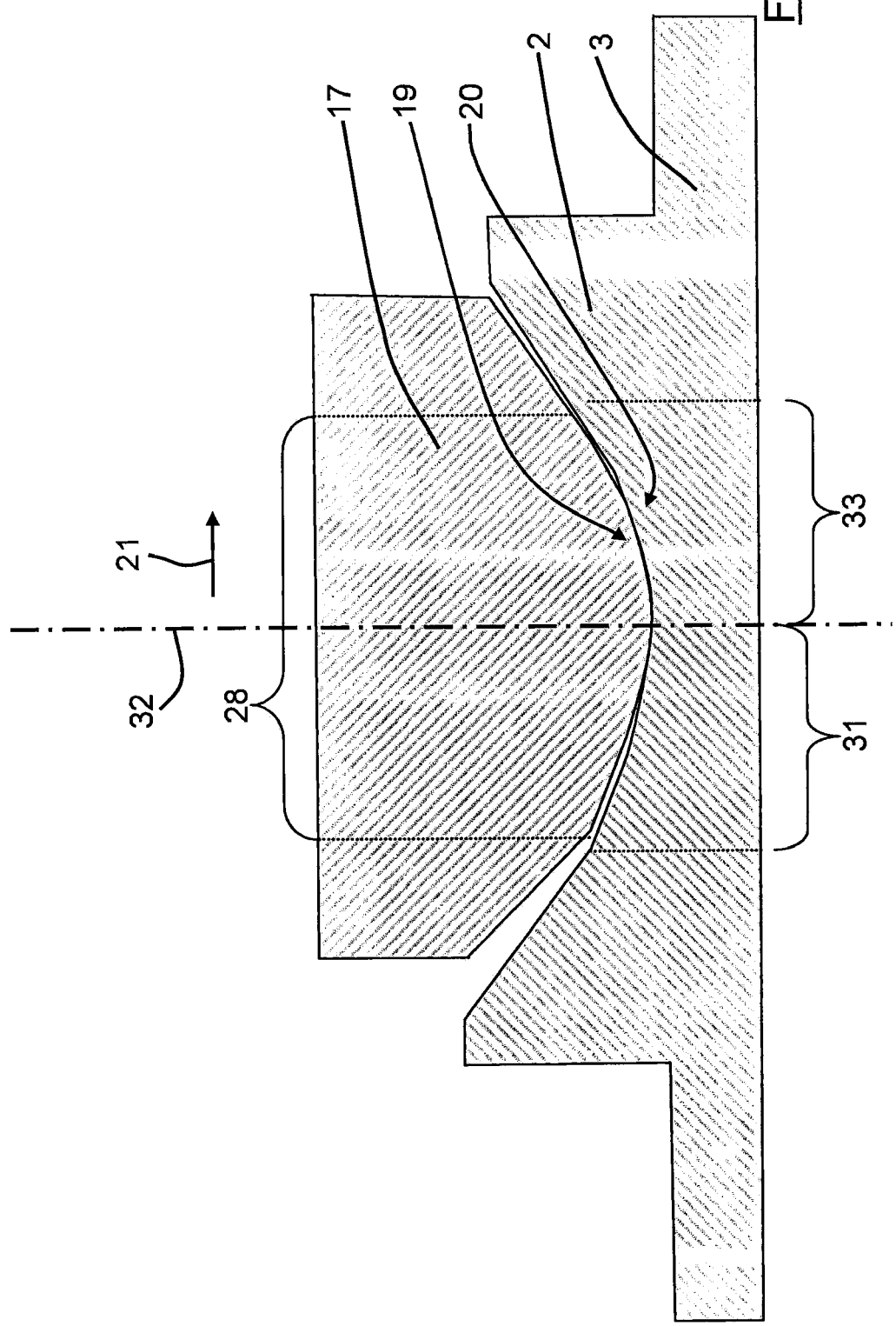
FIG. 7 shows a diagrammatic full-sectional illustration of an alternative version of the contact region from FIG. 6.

The contact region of contact element 8 and cam 2 is illustrated diagrammatically in detail in drawing FIGS. 6 and 7, and it can be seen here that the contour in the axial direction 21 of the cam 2 and of the contact element 8 has a middle region 27, 28 and comprises an edge-side marginal region 29, 30. In the embodiment illustrated, the middle region 27 of the cam 2 is designed to be solely concave and the middle region 28 of the contact element 8 to be solely convex.

The marginal region 29, 30 may either, as illustrated, have a convex or concave shape possessing another curvature and continuing the middle region 27, 28 or else be oppositely curved (not illustrated) or have no curvature.

Preferably, the marginal region 29, 30 of the cam 2 or of the contact element 8 is designed in such a way that it amounts to a maximum of ¼ of the overall length of the contour of the cam 2 or of the contact element 8, preferably to a maximum of ⅕, especially preferably to a maximum of ⅛ of the overall length of the contour of the cam 2 or of the contact element.

According to drawing FIG. 7, it is advantageous if, in a region 31, the cam 2 and/or the contact element 8 have/has a first curved contour in the axial direction 21 and, in a second region 33 of the cam 2 or contact element 8, the said region being arranged equidistantly opposite from the longitudinal mid-axis 32, have/has a second curved contour, the first and the second curved contour of the respective regions 31, 33 having different radii of curvature. Owing to the asymmetric contour profile, as illustrated in FIG. 7, over the length of the contact region, it is possible that, for example when non-symmetrical rocker arms 10 are used, the uneven forces occurring during their movement on account of the absence of symmetry can be counteracted. Thus, it is possible to counteract the abovementioned forces by an appropriate adaptation of an asymmetric curvature contour for a cam/contact-element contact region. Any adverse or undesirable dynamic effects resulting from the movement of the asymmetric rocker arms 10 can consequently be compensated.

Figure 8:
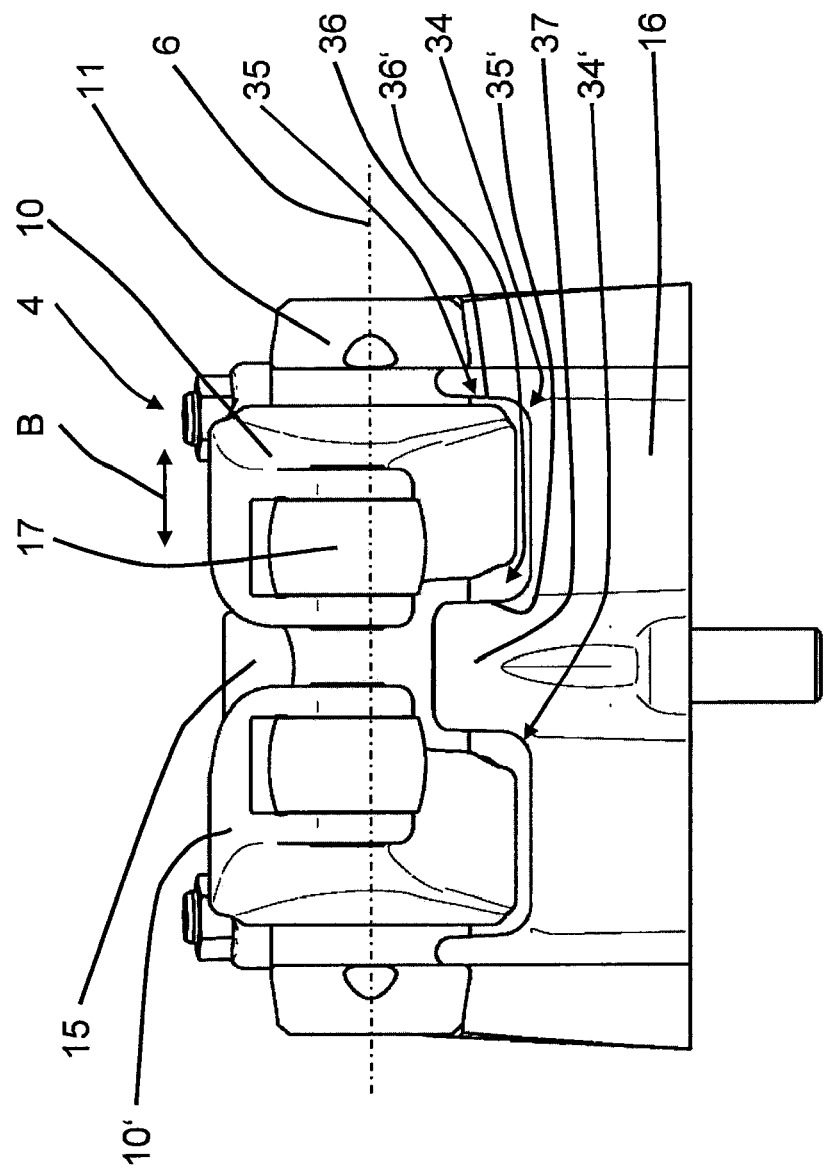
FIG. 8 shows a diagrammatic illustration of a mounted subassembly consisting of a bearing block, axial body, rocker arms, rollers and fixing means.

Drawing FIG. 8 shows the axial body 11 of the axis 6 which is fastened on a bearing block 16. The bearing block 16 is provided with two reception recesses 34, 34', each reception recess 34, 34' comprising in each case two flank regions 35, 35'. In each case a transmission element 7 or a rocker arm 10, 10' projects in the inner space of the reception recess 34, 34', the flank regions 35, 35' at least partially surrounding the transmission element 7 on both sides.

This surrounding of the transmission element 7 by the flank regions 35, 35' has a clearance 36, 36' which preferably amounts to 0.5 to 40.0 mm, especially preferably to 1 to 5 mm.

The bearing block 16 has a middle web 37 which is arranged between at least two reception recesses 34, 34', a fixing means 15 for fixing the axial body on the bearing block 16 being arranged in the region of the middle web 37.

The clearance 36, 36' ensures a movement B of the transmission elements 7, 7' which is permitted within limits, while, in the event of a malfunction or defect, the transmission elements 7 are inhibited by the flank regions 35, 35' from coming loose from the axial body 11. The flank regions 35, 35' can consequently serve as a securing element. Alternatively or additionally to this, the axial body 11 may be provided with a separate securing body, such as, for example, a securing ring, in the final assembly state the securing ring being spaced apart (clearances 36, 36') from the transmission element 7 and preventing the transmission element 7 from "creeping down" from the axial body 11 only in the event of a malfunction or defect.

Figure 9:
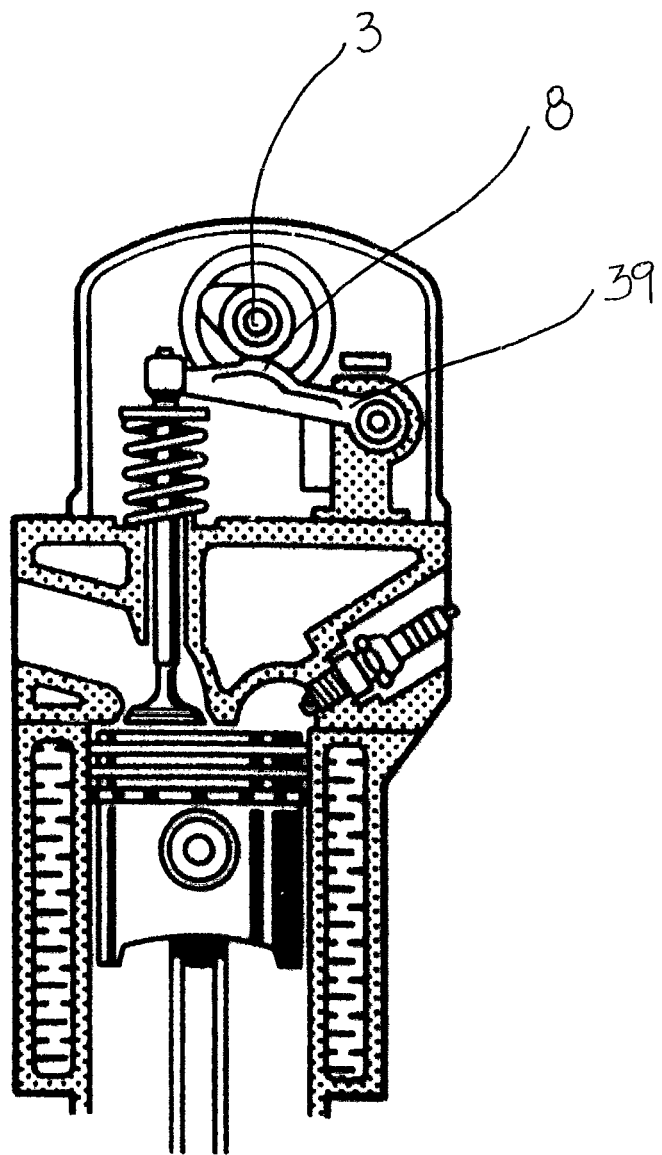
FIG. 9 is a schematic depiction of a drag lever.

In the versions illustrated, the transmission element 7 is illustrated as a rocker arm 10. Alternatively or additionally, the principle according to the present invention may also be used on an engine in which at least one transmission element 7 is designed as a drag lever 39 as shown schematically in FIG. 9. In the case of a drag lever, the axis of rotation of the lever is located at one end region and the introduction of force to a contact element 8 by the camshaft 3 takes place at a middle region.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A valve control for at least one valve for an internal combustion engine comprising:
    a rotatable camshaft (3) including at least one cam (2);
    an axis (6) and an axial body (11);
    a transmission mechanism for transmitting a movement of said at least one cam (2) to a valve stem of the at least one valve, said transmission mechanism comprising at least one transmission element (7) mounted rotatably and axially moveable on said axial body (11);
    a contact element (8) arranged on said transmission element (7) for connecting said transmission element (7) to said camshaft (3); said contact element (8) having a contact surface (19) and said at least one cam (2) having a circumferential surface (20), said contact surface (19) and said circumferential surface (20) having, at least in regions, curved and mutually corresponding contours in an axial direction configured so as to provide a form-fit between said contact surface (19) and said circumferential surface (20) of said cam (2) and to maintain the axial position of said transmission element (7) on said axial body (11); and wherein said contact element (8) is constructed as a roller body (17) mounted on said transmission element (7) for rotation about a roller body axis (18), said contact surface (19) constructed as a circumferential surface (22) of said roller body (17).

2. The valve control according to claim 1, wherein said transmission element (7) is constructed as one of a rocker arm (10) and a drag leaver.

3. The valve control according to one of claim 1, wherein said contact surface (19) of said contact element (8) has at least one convex contour region in the axial direction (21) and said circumferential surface of said cam (2) has at least one concave contact region in the axial direction (21) or wherein said contact surface (19) of said contact element (8) has at least one concave contour region in the axial direction and said circumferential surface (20) of said cam (2) has at least one convex contour region in the axial direction (21).

4. The valve control according to claim 1, wherein said at least one cam (2) and said contact element (8) comprises a middle region (27, 28) and at least one edge-side marginal region (29, 30), said middle region constructed to be one of solely convex and solely concave.

5. The valve control of claim 1, additionally comprising a longitudinal mid-axis (32) and wherein, in a first region, said at least one cam (2) and said contact element (8) has a first curved partial contour in the axial direction (21), and in a second region, said at least one cam (2) and said contact element (8) has a second curved partial contour, a radial side of said first and said second regions arranged equidistant from said longitudinal mid-axis (32), and said first and second curved partial contour having different radii of curvature.

6. The valve control according to claim 3, wherein said at least one convex contour in the axial direction of said contact surface (19) of said contact element (8) or said convex contour of said circumferential surface (20) of said cam (2) has a radius of 8 to 50 mm.

7. The valve control according to claim 3, wherein the rolling body has an outside diameter and a width and the concave contour of the rolling body has a radius; and wherein the ratio of the radius (24) of at least one convex contour in the axial direction of said rolling body (17) to the outside diameter (38) of said rolling body (17) is between 1.00:0.15 and 1.00:3.45; and/or the ratio of the radius of the concave contour of said rolling body (17) to the width of said rolling body (17) is between 1.00:0.30 and 1:6.

8. The valve control according to claim 1, wherein said transmission element (7) has axial movability on said axial body (11); said valve control additionally comprising at least one securing element for limiting the axial movability of said transmission element.

9. The valve control according to claim 1, additionally comprising a bearing block (16), said axial body (11) fastened on said bearing block (16); said bearing block (16) comprising at least one reception recess (34, 34') having an inner space defined by flank regions (35, 35'); said transmission element (7) projecting at least partially into said inner space of said reception recess; and said flank regions (35, 35') at least partially surrounding both sides of said transmission element (7).

10. The valve control according to claim 9, wherein said flank regions (35, 35') of said bearing block (16) define a clearance (36, 36') on both sides of said transmission element (7); said clearance being from 0.5 to 40.0 mm.

11. The valve control according to claim 9, additionally comprising a second transmission member and said bearing block comprising at least one additional reception recess, and wherein said axial body (11) mounted on said bearing block (16) is constructed for mounting said at least two transmission elements (7); said bearing block (16) having said at least two reception recesses (34, 34') separated by a middle web (37), each of said recesses having an inner space for receiving one of said transmission elements (7); said valve control further comprising at least one fixing element (15) disposed at said middle web (37) for fixing said axial body (11) of said axis (6).

12. The valve control according to claim 1, wherein the at least one transmission element is a first transmission element assigned to the at least one valve, the at least one valve being an outlet valve, the valve control having a second transmission element assigned to a second valve of a second cylinder, the second valve being an outlet valve.

13. In combination, an internal combustion engine and a valve control according to claim 1.

14. The valve control according to claim 3, wherein said at least one convex contour in the axial direction of said contact surface (19) of said contact element (8) or said convex contour of said circumferential surface (20) of said cam (2) has a radius of 10 to 40 mm.

15. The valve control according to claim 3, wherein said at least one convex contour in the axial direction of said contact surface (19) of said contact element (8) or said convex contour of said circumferential surface (20) of said cam (2) has a radius of 15 to 25 mm.

16. The valve control according to claim 3, wherein the rolling body has an outside diameter and a width and the concave contour of the rolling body has a radius; and wherein the ratio of the radius (24) of at least one convex contour in the axial direction of said rolling body (17) to the outside diameter (38) of said rolling body (17) is between 1.00:0.5 and 1.0:1.5; and/or the ratio of the radius of the concave contour of said rolling body (17) to the width of said rolling body (17) is between 1:05 and 1:3.0.

17. The valve control according to claim 3, wherein the rolling body has an outside diameter and a width and the concave contour of the rolling body has a radius; and wherein the ratio of the radius (24) of at least one convex contour in the axial direction of said rolling body (17) to the outside diameter (38) of said rolling body (17) is between 1.00:0.15 and 1.0:1.5; and/or the ratio of the radius of the concave contour of said rolling body (17) to the width of said rolling body (17) is between 1:1 and 1:1.5.

18. The valve control according to claim 9, wherein said flank regions (35, 35') of said bearing block (16) define a clearance (36, 36') on both sides of said transmission element (7); said clearance being from 1 to 5 mm.

19. A method for limiting the axial movability of a transmission element (7) for transmitting the movement of a cam (2) of a camshaft (3) at least one valve, the transmission element (7) comprising a rocker arm or drag lever mounted on an axial body (11) of an axis (6) and being provided with a contact element (8) arranged between the transmission element (7) and the camshaft, said method comprising:

mounting the transmission element (7) so as to be axially movable on the axial body (11);

providing a contact surface (19) of the contact element (8) and a circumferential surface (20) of the cam (2), at least in regions, with contours which are curved in an axial direction (21) and mutually corresponding, so that curved and corresponding contact surfaces of the contact element (8) and cam (2) ensure at least limited axial movability of the transmission element (7) in relation to the axis (6) configured so as to provide a form-fit between said contact surface (19) and said circumferential surface (20) of said cam (2) and to maintain the axial position of said transmission element (7) on said axial body 1); and wherein said contact element (8) is constructed as a roller body (17) mounted on said transmission element (7) for rotation about a roller body axis (18), said contact surface (19) constructed as a circumferential surface (22) of said roller body (17).

* * * * *